United States Patent [19]

Chang et al.

[11] 3,848,252

[45] Nov. 12, 1974

[54] MAGNETIC KEYBOARD

[75] Inventors: Harry C. Chang, Chelsea; Richard J. Strnad; Raymond D. Suelflow, both of Wappingers Falls, all of N.Y.

[73] Assignee: International Business Machines Corporation, Armonk, N.Y.

[22] Filed: Feb. 24, 1972

[21] Appl. No.: 228,977

Related U.S. Application Data

[63] Continuation of Ser. No. 18,567, March 11, 1970, abandoned.

[52] U.S. Cl. .......... 340/365 L, 323/94 H, 338/32 H

[51] Int. Cl. .......... G06f 3/02

[58] Field of Search ... 340/365 L, 174 HA, 174 EB; 338/32 H; 335/206; 323/94 H; 307/278, 290; 317/235 H

[56] References Cited

UNITED STATES PATENTS

| | | | |
|---|---|---|---|
| 3,596,114 | 7/1971 | Maupin | 307/278 |
| 3,449,517 | 6/1969 | Turja | 307/278 |
| 3,611,358 | 10/1971 | Dalmasso | 340/365 L |
| 3,537,046 | 10/1970 | Hubrich et al. | 323/94 H |
| 3,495,236 | 2/1970 | Mathamel | 340/365 L |
| 3,573,810 | 4/1971 | Hanewinkel | 340/365 L |
| 3,430,226 | 2/1969 | Chow et al. | 340/365 L |
| 3,305,790 | 2/1967 | Parsons et al. | 317/235 H |
| 3,054,910 | 9/1962 | Bothwell | 307/290 |

OTHER PUBLICATIONS

IBM Technical Disclosure, Vol. 12, No.3, 8/69, pp. 436,437, "Magnetoresistive Contact-Less Switch."

*Primary Examiner*—John W. Caldwell
*Assistant Examiner*—Robert J. Mooney
*Attorney, Agent, or Firm*—Martin G. Reiffin

[57] ABSTRACT

A keyboard is provided with a plurality of manually operable keys each having a ferromagnetic member movable to and from a position in the space between a permanent magnet and a magnetosensitive element. The position of the ferromagnetic member thereby affects the flux density of the magnetic field at the respective magnetosensitive element. A circuit generates an electrical signal in response to the magnitude of the flux density at each of said magnetosensitive elements and thereby in response to the manual operation of each of said keys.

3 Claims, 4 Drawing Figures

MAGNETIC KEYBOARD

CROSS-REFERENCE TO RELATED APPLICATION

This application is a continuation of our prior co-pending application Ser. No. 18,567, filed Mar. 11, 1970, entitled Magnetic Keyboard, and now abandoned.

FIELD OF THE INVENTION

The present invention has utility in those fields requiring the use of a keyboard or similar arrangement of manually operable keys. This includes typewriters, punch card machines, control consoles for computers, and similar applications.

DESCRIPTION OF THE PRIOR ART

In the prior art of keyboards and similar arrangements of manually operable elements, there were generally provided mechanical linkages for sensing depression of the keys by the operator. The keyboards therefore had a particular "touch"; that is, a force opposing depression of the keys. This "touch" was dictated by the mechanical linkages and could not be readily varied or controlled by the designer of the keyboard.

SUMMARY OF THE INVENTION

It is a primary object of the present invention to provide a keyboard eliminating mechanical linkages or other mechanism for sensing the depression of the keys. Instead, each key is provided with a ferromagnetic member movable with respect to a magnet and a magnetosensitive element. The flux at the latter is varied when the key is depressed and an electrical circuit senses this varied field and generates an electrical signal as the output in response to the depression of each key.

The structure of the present invention may also be embodied to other types of apparatus such as electrical switches. In this application the present invention is particularly advantageous in that it eliminates so called "bounce" generally prevalent with mechanical switches.

Other objects and advantages of the present invention are inherent in the disclosed structure or will be apparent to those skilled in the art.

DESCRIPTION OF THE PREFERRED EMBODIMENTS

Figure 2:
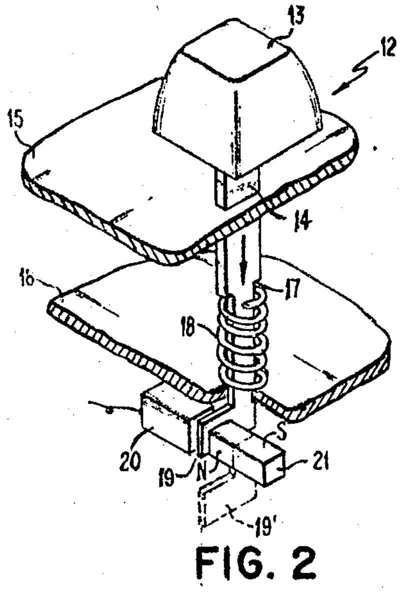
FIG. 2 is a perspective view showing the structure of each key and its associated magnet, magnetosensitive element and ferromagnetic member.
Figure 1:
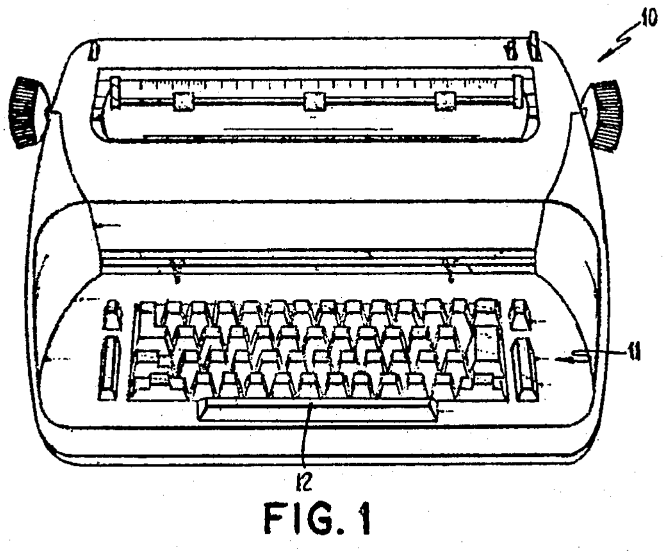
FIG. 1 shows a keyboard embodying the present invention in the form of a typewriter.

Referring first to FIG. 1, there is shown a typewriter 10 including a keyboard 11 comprising a plurality of manually operable keys 12. The structure of each of the keys 12 is shown in FIG. 2. Each key 12 is provided at its upper end with a portion 13 adapted to be struck by the operator's finger and from which extends a shaft 14 rectangular in cross-section. Keyboard 11 further comprises a frame including a pair of spaced plates 15, 16. Plate 15 is provided with a rectangular opening through which extends the shaft 14. The lower end of the latter is reduced to provide a shoulder 17 against which abuts the upper end of a coil spring 18 having its lower end abutting the upper surface of plate 16. The coil spring 18 surrounds the reduced portion of the lower end of the shaft 14. Upon depressing key 12 the coil spring 18 undergoes compression so as to urge the key 12 upwardly toward its original quiescent position after release of key 12.

At the lower end of shaft 14 there is provided a substantially rectangular ferromagnetic member 19. When the key 12 is in its uppermost quiescent position the ferromagnetic member 19 is in the position shown in solid lines and is located between a magnetosensitive element 20 and a permanent magnet 12 providing a source of flux. Upon depression of key 12 the ferromagnetic member 19 moves downwardly to the position 19' shown in dashed lines. This varies the permeability of the space between magnet 21 and magnetosensitive element 20 so as to vary the flux cutting the latter. The magnetosensitive element 20 may be either a magneto-resistor or a Hall effect device so as to generate a signal in response to the variation of the permeability achieved by depressing key 12.

Figure 3:
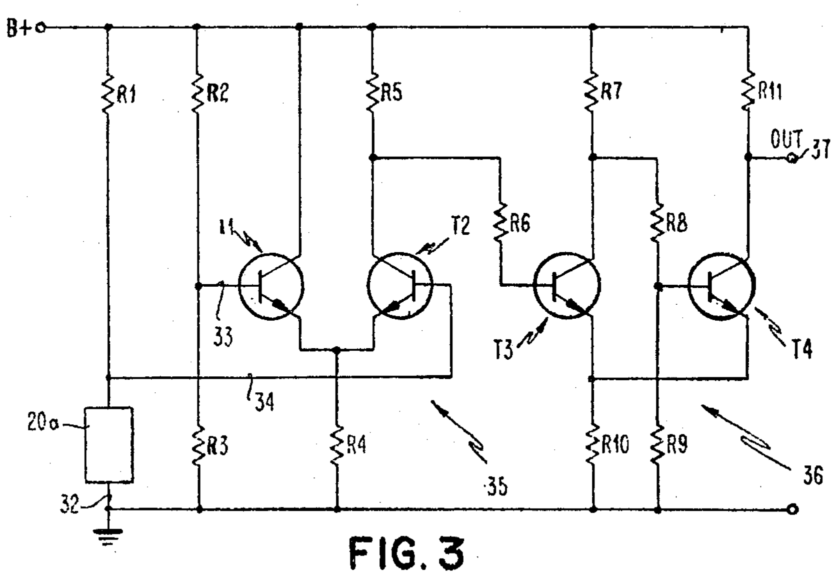
FIG. 3 shows a circuit means for converting the movement of the key to an electrical signal and utilizing a magneto-resistor as the magnetosensitive element.

Referring now to FIG. 3, there is shown the circuit arrangement for amplifying the electrical signal in the embodiment utilizing a magneto-resistor as the magnetosensitive element 20. More particularly, it is well-known that a resistor immersed in a magnetic field has a longitudinal resistance magnitude functionally related to the flux density. In FIG. 3 the magneto-resistor is indicated at 20*a* and has one end grounded by lead 32. Its opposite end is connected to the lower end of resistor R1 having its upper end connected to the B+ terminal of a source of potential. Extending from the B+ line is another resistor R2 having its lower end connected to the upper end of a resistor R3 which in turn has its lower end connected to ground.

The magneto-resistor 20*a* and resistors R1, R2 and R3 thereby form a bridge circuit to which are connected the two input leads 33, 34 of a differential amplifier indicated generally at 35. The latter comprises a first transistor T1 and a second transistor T2 having their emitters connected to the upper end of a resistor R4 extending to ground. The input leads 33, 34 are connected to the respective bases of transistors T1, T2. The collector of transistor T1 is connected to the B+ line and the collector of T2 is provided with a load resistor R5. The differential amplifier 35 thereby amplifies the signal due to the variation in resistance of the magneto-resistor 31.

The collector of transistor T2 is connected by resistor R6 to the input of a Schmitt trigger indicated generally by the reference numeral 36 and comprising a pair of transistors T3, T4 having their emitters connected to the upper end of a resistor R10 having its lower end connected to ground. Extending from the B+ line is a resistor R7 connected to the collector of transistor T3 which is also connected through resistor R8 to the base of transistor T4. Another resistor R9 extends from the base of T4 to ground. The collector of transistor T4 is connected to the B+ line through a load resistor R11. The output is taken from the collector of transistor T4 as indicated at 37. A resistor R9 extends from the base of transistor T4 to ground. The Schmitt trigger converts the amplified analog signal to a binary digital signal having two defined voltage levels.

Figure 4:
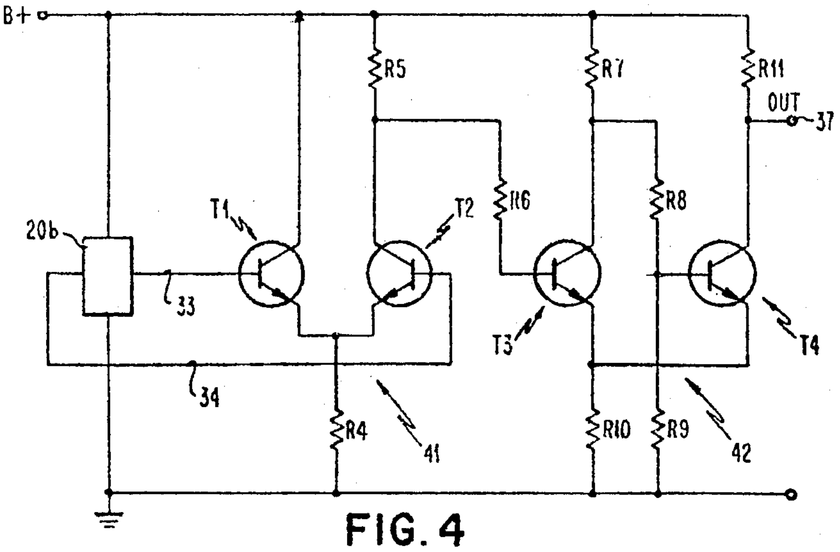
FIG. 4 shows a circuit arrangement wherein the magnetosensitive element is in the form of a Hall-effect device.

Referring now to FIG. 4 there is shown a circuit similar to FIG. 3 except that the magnetosensitive element 20 is embodied as a Hall-effect device 20*b*. That is, the device generates a voltage in a transverse direction perpendicular to the flow of current therethrough and in response to a magnetic field, as distinguished from the longitudinal voltage provided by the magneto-resistor 20*a* in FIG. 3. This transverse voltage to applied to the input leads 33, 34 of differential amplifier 41, the output of which is connected to a Schmitt trigger 42. Differential amplifier 41 and Schmitt trigger 42 are the same as differential amplifier 35 and Schmitt trigger 36, respectively, and the like components thereof have applied thereto the same reference designations as those in FIG. 1.

The amplified signal at the output 37 of each of the Schmitt triggers may be utilized to actuate other devices. For example, the output signals may be applied to activate solenoid-actuated type font elements (not shown) to provide an electric typewriter, as will be readily understood by those skilled in the art.

We claim:

1. A keyboard comprising a plurality of manually operable keys, a frame, means movably mounting said keys to said frame, a plurality of Hall-effect devices each associated with a respective one said keys for providing a change in voltage in response to a change in the magnetic flux density in the region of said Hall-effect device, a plurality of sources of magnetic flux each associated with a respective one of said Hall-effect devices, said magnetic flux extending from each of said sources to its respective Hall-effect device, each of said keys having a ferromagnetic member connected thereto and movable from a first position to a second position in response to manual operation of said key, the magnitude of the flux density at said respective Hall-effect device being responsive to the position of said ferromagnetic member, a plurality of differential amplifiers each having input nodes connected across a respective one of said Hall-effect devices so as to amplify said voltage change provided in response to said change in magnetic flux density, and a plurality of trigger circuits each connected in cascade to a respective one of said differential amplifiers so as to convert the analog output signal of the respective differential amplifier to a binary digital signal.

2. A keyboard as set forth in claim 1 wherein each of said differential amplifiers comprises a pair of transistor each having a base, collector and an emitter, each of said Hall-effect devices having a first pair of opposite faces and a second pair of opposite faces extending perpendicular to said first pair of faces, means connected to said first pair of faces of each Hall-effect device to supply current therethrough, said bases of each pair of differential amplifier transistors being connected to said second pair of faces of the respective Hall-effect device, a current source connected to the emitters of each pair of differential amplifier transistors, a load resistor connected to a collector of at least one transistor of each pair of differential amplifier transistors, and conductive means connecting said last-recited collector to the respective trigger circuit.

3. A keyboard as set forth in claim 2 wherein each of said trigger circuits is a Schmitt trigger circuit including two transistors having mutually-coupled emitters, one of said Schmitt trigger circuit transistors having a base coupled to said last-recited differential amplifier transistor collector.

* * * * *